(12) United States Patent
Moore et al.

(10) Patent No.: US 10,419,824 B2
(45) Date of Patent: *Sep. 17, 2019

(54) SYSTEM AND METHOD FOR METADATA-LINKED ADVERTISEMENTS

(71) Applicant: Rovi Guides, Inc., San Jose, CA (US)

(72) Inventors: Sean. S. Moore, Tulsa, OK (US);
David M. Berezowski, Tulsa, OK (US);
Todd A. Walker, Berwyn, PA (US);
Michael D. Ellis, Boulder, CO (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/013,485

(22) Filed: Jun. 20, 2018

(65) Prior Publication Data

US 2018/0367867 A1 Dec. 20, 2018

Related U.S. Application Data

(63) Continuation of application No. 14/511,479, filed on Oct. 10, 2014, now Pat. No. 10,015,562, which is a
(Continued)

(51) Int. Cl.
*H04N 7/10* (2006.01)
*H04N 21/81* (2011.01)
(Continued)

(52) U.S. Cl.
CPC .......... *H04N 21/812* (2013.01); *G06Q 30/02* (2013.01); *G06Q 30/0241* (2013.01);
(Continued)

(58) Field of Classification Search
CPC ............. H04N 21/8543; H04N 21/812; H04N 21/2353; H04N 21/2668
(Continued)

(56) References Cited

U.S. PATENT DOCUMENTS 7,168,084 B1 * 1/2007 Hendricks .............. H04H 20/10
725/42

OTHER PUBLICATIONS

"Advanced Television Enhancement Forum Specification (ATVEF)", ATVEF, 1998, 1999, Draft Version 1.1r26, pp. 1-37 (updated Feb. 2, 1999).
(Continued)

*Primary Examiner* — Jivka A Rabovianski
(74) *Attorney, Agent, or Firm* — Haley Guiliano LLP (57) ABSTRACT

Systems and methods for providing metadata-selected advertisements are provided. These systems and methods may receive metadata and other media, select an object, read metadata attached to or associated with the selected object, select an advertisement based on the metadata, and display the selected advertisement. In addition, monitoring, collecting, and recording of predefined data concerning metadata selected advertisements may be provided. The invention also provides a receiver for receiving signals and/or data (e.g., programs, advertisements, program guides, metadata, etc.) and a processor for accepting a user's input signal, selecting an object, reading metadata attached to or associated with a selected object, selecting an advertisement, and displaying the selected advertisement.

20 Claims, 7 Drawing Sheets

Related U.S. Application Data continuation of application No. 12/635,459, filed on Dec. 10, 2009, now Pat. No. 8,863,170, which is a continuation of application No. 09/823,588, filed on Mar. 30, 2001, now abandoned.

(60) Provisional application No. 60/193,948, filed on Mar. 31, 2000.

(51) Int. Cl.
  *G06Q 30/02* (2012.01)
  *H04N 21/235* (2011.01)
  *H04N 21/2668* (2011.01)

(52) U.S. Cl.
  CPC ..... *G06Q 30/0251* (2013.01); *G06Q 30/0256* (2013.01); *H04N 21/2353* (2013.01); *H04N 21/2668* (2013.01)

(58) Field of Classification Search
  USPC .................................. 725/34, 42, 116, 122
  See application file for complete search history.

(56) References Cited

OTHER PUBLICATIONS

"Overview of the MPEG-7 Standard", International Organisation for Standardisation,Organisation Internationale De Normalisation, ISO IEC JTC1/SC29/WG11/N3158, Dec. 1999/Maui, Hawaii (30 paqes).
Pereira, Fernando, "MPEG-7: A Standard for Describing Audiovisual Information", IEE Colloquium Multimedia Databases and MPEG-7, 1998 (6 pages).

* cited by examiner

SYSTEM AND METHOD FOR METADATA-LINKED ADVERTISEMENTS

CROSS REFERENCE TO RELATED APPLICATION

This application is a continuation of U.S. patent application Ser. No. 14/511,479 (now Allowed), which is a continuation of U.S. patent application Ser. No. 12/635,459, filed Dec. 10, 2009 (now U.S. Pat. No. 8,863,170), which is a continuation of Ser. No. 09/823,588, filed Mar. 30, 2001 (now abandoned), which claims the benefit of U.S. Provisional Patent Application No. 60/193,948, filed Mar. 31, 2000, which are hereby incorporated by reference herein in their entireties.

BACKGROUND OF THE INVENTION

This invention relates to advertisement delivery systems and methods. More particularly, this invention relates to systems and methods that associate advertisements with other media using metadata links.

With the advent of modern television equipment and communication networks, advertisers have been able to provide graphical advertisements to viewers such as ordinary television commercials. However, in the past, these systems were limited in their functional capabilities and typically only provided non-content or semi-content related advertisements to viewers.

To increase the effectiveness of advertisements, it may be advantageous to both advertisers and consumers alike to associate what is being advertised with other media (e.g., programs, applications, etc) that are provided to viewers. Associating these advertisements with other media may not only tend to increase the effectiveness of the advertisements, but doing so may also provide users with an increased awareness of the content of such other media, as opposed to simply being subject to an advertisement for a product or service without being provided additional information.

It is, therefore, an object of the invention to provide systems and methods for associating advertisements with other media using metadata.

SUMMARY OF THE INVENTION

In accordance with this and other objects of the present invention, systems and methods for associating advertisements with other media are provided. These systems and methods may associate advertisements with other media by using an enhanced data set herein referred to as "metadata". For example, metadata is data that may be used to describe programming and may include any information that may be associated with a program and/or that may describe the program, its content, or services related to the program.

One aspect of the present invention may include advertisements that are targeted to other media based on metadata contained within such other media. For example, metadata may be provided at the scene level of a program. By providing metadata at the scene level, more descriptive information about a program or other media can be provided in a more temporally associated way.

Another aspect of the invention may include advertisements that are provided within display screens of guidance applications based on metadata of other media attached to or associated with the guidance application. For example, in an interactive program guide, advertisements may be presented in a browse overlay and such advertisements may be based on metadata associated with a currently selected program listing. In addition, the interactive program guide may present advertisements in a menu or guide overlay based upon the metadata associated with the last program viewed.

A further aspect of the invention may include metadata that contains a source reference for an advertisement. The source reference may be, for example, a Uniform Resource Locator (URL). This source reference may be recorded or otherwise stored by a guidance application. For example, on playback of the recorded program, the guidance application may play back advertisements from a location defined by the source.

Still a further aspect of the invention may include enabling a system provider to manage advertisement inventories and to provide marketing and other data to advertisers. For example, through polling, monitoring user requests, or using any other scheme suitable to the chosen implementation of the system, a system provider may track valuable marketing information and provide such information to advertisers.

BRIEF DESCRIPTION OF THE DRAWINGS

The above and other objects and advantages of the invention will be apparent upon consideration of the following detailed description taken in conjunction with the accompanying drawings in which like reference characters refer to like parts throughout and in which.

DETAILED DESCRIPTION OF THE PREFERRED EMBODIMENTS

The present invention provides systems and methods for associating advertisements with other media (e.g., programs, applications, etc).

These systems and methods may associate advertisements with other media by using an enhanced data set herein referred to as "metadata". Metadata may be used to describe programming and may include any information that may be associated with a program and/or that may describe a program, its content, or services related to a program. Metadata may describe, for example, the content of a program, whether commercials may be skipped during playback of a recorded program, or the clothes that an actor is wearing.

Metadata may be transmitted and/or received by a user's equipment (e.g. a set-top box) through any communications network (e.g., cable systems, satellite systems, modems, wireless paging frequencies, the Internet, etc., or any combination thereof). Furthermore, metadata may be transmitted and/or received by the user's equipment on one or more broadcast channels. For example, a program may be received on a program channel, and metadata for that program may be received through this program channel's vertical blanking interval (VBI). Additionally, metadata may be provided by utilizing other existing analog and digital technologies such as the "Advanced Television Enhancement Forum" (ATVEF) protocol for enhanced television programming.

One aspect of the present invention may include advertisements that are targeted to other media based on the metadata contained within such other media. For example, metadata may be provided at the scene level of a program. Each scene of the program may show a different product. In one scene, an actor may be driving a certain car or wearing a particular type of clothing. In another scene, the actor may be wearing different clothing, or another actor may be in the shot with other items that may be promoted (e.g., a cell phone, sun glasses, etc). As stated above, these products may be linked to advertisements for these products using metadata. By providing metadata at the scene level, more descriptive information about a program or other media can be provided in a more temporally associated way. In this way, the advertising of a product is enhanced because the viewer can watch the product or service as it is worn, used, or provided.

Another aspect of the invention may include advertisements that are provided within the display screens of guidance applications based on metadata of other media attached to or associated with the guidance application. For example, in an interactive program guide, advertisements may be presented in a browse overlay and such advertisements may be based on metadata associated with a currently selected program listing. The metadata for a program listing may include any descriptive information about the program itself, the channel the program is being displayed on, and/or any other information attached to or associated with the program listing.

Another aspect of the invention may include metadata that contains a source reference for an advertisement. The source reference may be, for example, a Uniform Resource Locator (URL). For example, when a program is recorded, the metadata along with the source reference may be recorded or otherwise stored by a guidance application. On playback of the recorded program, the guidance application may play back advertisements from a source as defined, for example, using a URL contained in the recorded program. A system provider may then replace previously stored and now outdated advertisements with new ones having the same identifier. Therefore, for example, when a program is recorded and subsequently played back, new advertisements may be retrieved and presented simply by changing an advertisement's identifier.

Another aspect of the invention may include enabling a system provider to manage advertisement inventories and provide marketing and other data to advertisers. The system provider may manage advertisement inventories by providing fresh advertisements, as described above. By providing fresh advertisements, the system provider controls what advertisements the viewer sees when playing back a recorded program. By controlling which advertisement a viewer sees on playback, the system provider may be able to sell playback advertising space to advertisers.

Furthermore, system providers may provide advertisers valuable marketing information and other data. Through polling, monitoring user requests, or using any other scheme suitable to the chosen implementation of the system, a system provider may track valuable marketing information and provide such information to advertisers. Marketing information may include the program recorded, the number of times an advertisement is accessed, the time at which the advertisement was accessed, etc., and may also include demographic information associated with a user's account.

In one embodiment of the invention, a system may include: one or more receivers that may receive signals and/or data; one or more transmitters that may transmit signals and/or data; a processor that accepts a user's input signal, that selects an object within the visual plane of a video display, that reads metadata, that selects an advertisement, and that causes the advertisement to be displayed; and one or more storage devices capable of electronically storing signals and/or data.

In another embodiment of the invention, a system may include a processor that accepts a user's input signal, that reads metadata, that downloads an advertisement, and that causes the advertisement to be displayed.

In still another embodiment of the invention, a system may include a processor that monitors metadata-selected advertisements, that collects data relating to the metadata-selected advertisement, and that causes the data to be recorded.

Figure 1:
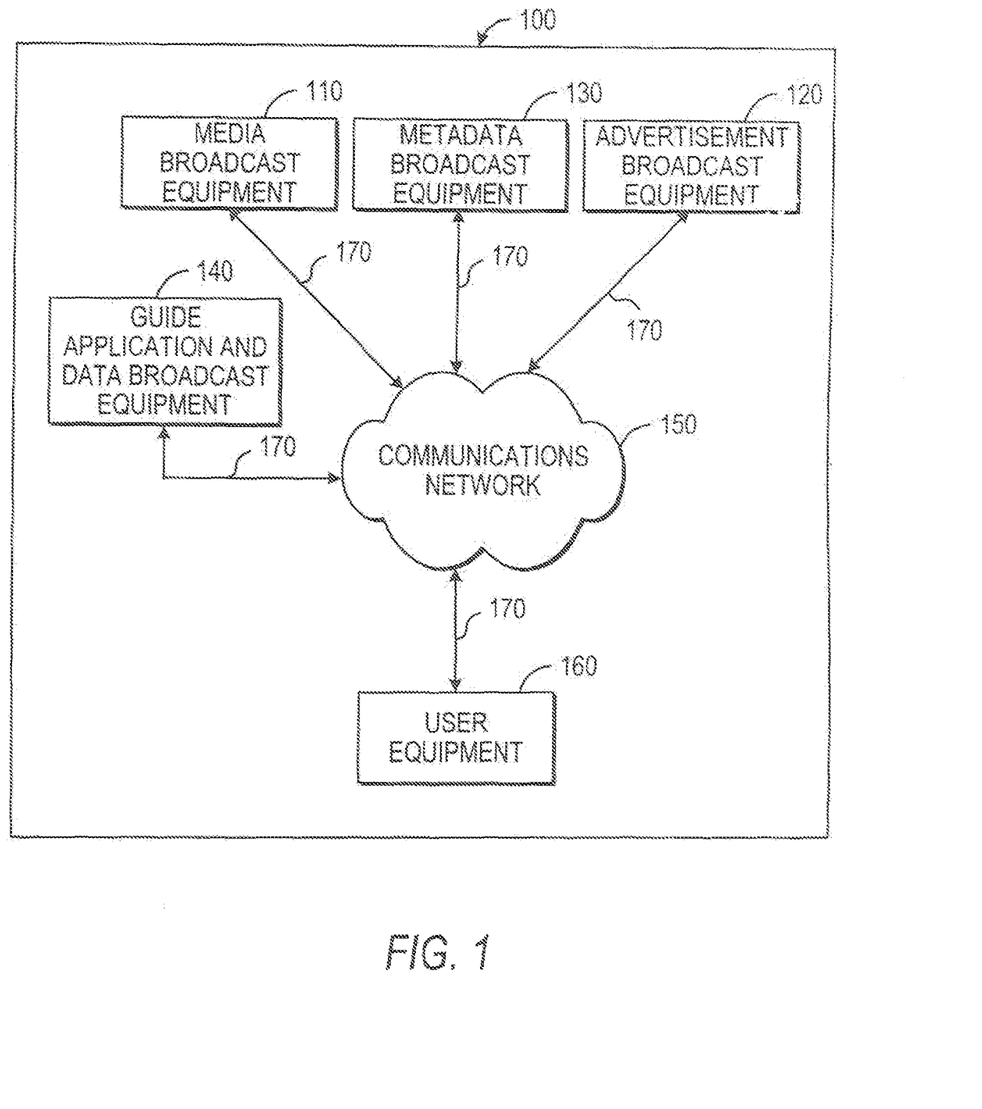
FIG. 1 is a block diagram of a system that may be used to implement various embodiments of the present invention.

FIG. 1 is a block diagram of a system 100 that may be used to implement various embodiments of the present invention. System 100 may comprise media broadcast equipment 110, advertisement broadcast equipment 120, metadata broadcast equipment 130, guide application and data broadcast equipment 140, communications network 150, user equipment 160, and communications links 170. Broadcast equipment 110, 120, 130, and 140 may be any suitable equipment for providing media (e.g., programs, applications, and other signals and data), such as video and data servers, live broadcast equipment, video tape players, etc., and may be located at a cable headend or at any other convenient location. In addition, broadcast equipment 110, 120, 130, and 140 may be combined into a single broadcast unit or combined in other ways.

Communication network 150 may be any suitable network for transmitting signals and/or data to and/or from broadcast equipment 110, 120, 130 and 140. For example, network 150 may be the Internet, a satellite communications system, a cable system, a local area network, a wide area network, etc., or any combination of the same. Communication network 150 may use digital or analog technology or any combination thereof.

User equipment 160 may be any suitable equipment for receiving, transmitting, processing and/or displaying signals and/or data received from and/or transmitted to broadcast equipment 110, 120, 130 and 140. For example, user equipment 160 may be a one or two-way set-top box, a television with processing and storing capability, a personal video recorder, a video cassette recorder with suitable processing capabilities, a personal computer, etc.

Communication links 170 may be any suitable links for communicating data and/or signals, such as a dial-up connection, a fiber optic cable, a coaxial cable, a DSL connection, etc., or any combination of the same.

Although not shown in FIG. 1, system 100 may also include one or more remote storage units that may be used to store media, advertisements, metadata, guidance applications and data. These remote storage units may receive media, advertisements, metadata, guidance applications, and other data from broadcast equipment 110, 120, 130, and/or 140, may be controlled by any of broadcast equipment 110, 120, 130, and 140 and user equipment 160, and may provide the media, advertisements, metadata, guidance applications and other data to user equipment 160 via communications network 150.

Figure 2:
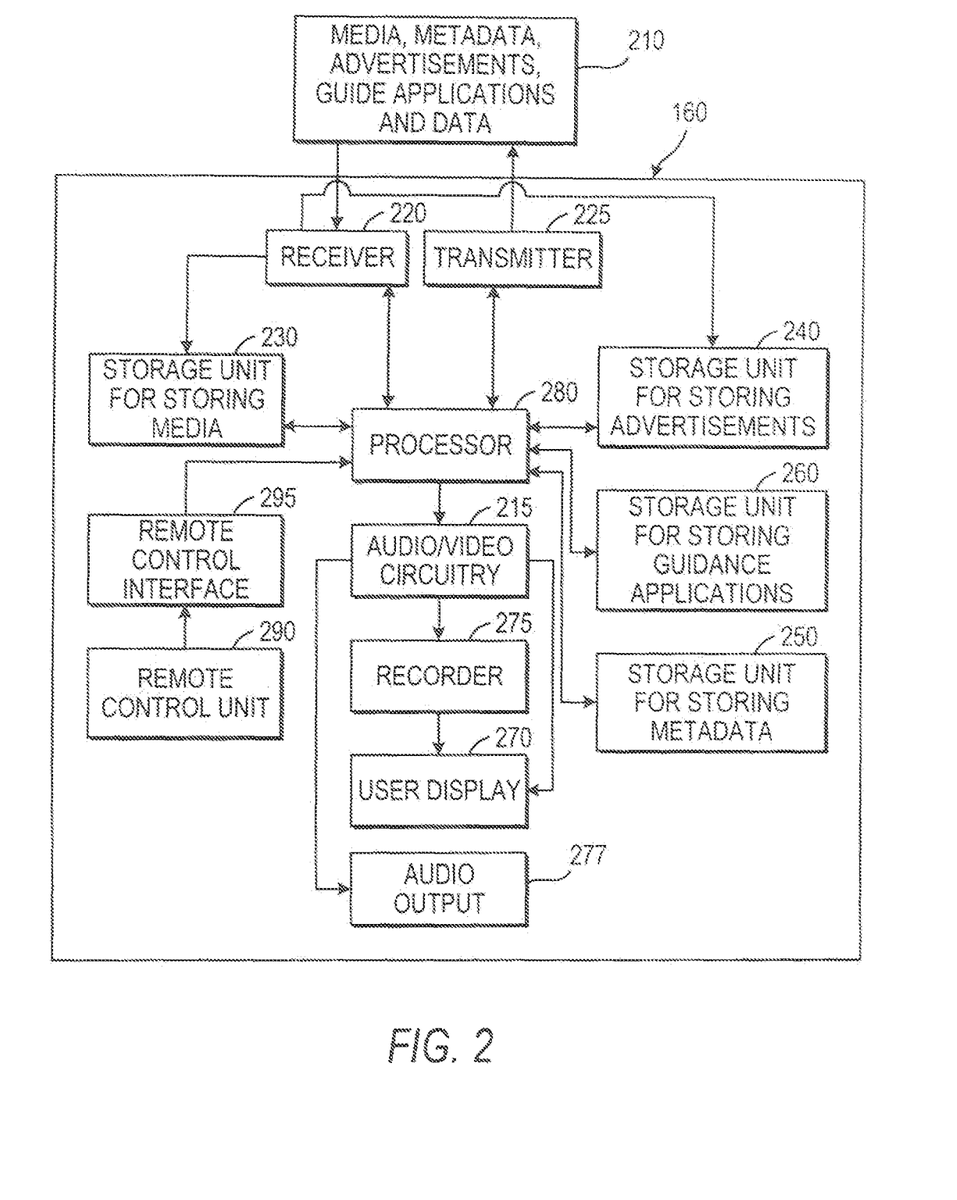
FIG. 2 is a block diagram of user equipment that may be used in accordance with various embodiments of the present invention.

FIG. 2 is a block diagram of user equipment 160 shown in FIG. 1. User equipment 160 may be used in accordance with various embodiments of the present invention. User equipment 160 may include: a receiver 220; a transmitter 225; a processor 280; storage units 230, 240, 250 and 260; a user display 270; a recorder 275; an audio output 277; a remote control unit 290; a remote control interface 295, and audio/video circuitry 215. Receiver 220 may be any suitable equipment for receiving guidance applications and data, and/or any other desired signals or data (e.g., media, advertisements, metadata, guides applications and data, URL addresses, audio, etc). Transmitter 225 may be any suitable equipment for transmitting data and/or any other desired signals. The signals and/or data received and/or transmitted by receiver 220 and transmitter 225 may be transmitted and/or received through any communications network, as described above. Processor 280 may be any suitable equipment for accepting a user input signal, reading metadata attached to or associated with an advertisement and other media, selecting an advertisement, causing an advertisement to be downloaded from a remote location, and causing an advertisement to be displayed. Storage units 230, 240, 250, and 260 may be used for storing media, advertisements, metadata, audio, and guidance applications and data, respectively. Any of storage units 230, 240, 250, and 260 may be any devices that are capable of storing signals and/or data (e.g., a separate video cassette recorder, a disk drive, a memory card, etc). Storage units 230, 240, 250, and 260, if desired, may also be combined into a single storage unit or combined in other ways. Remote control unit 290 may be a keyboard, a touch screen display, a front panel, or any other wired or wireless device that a user may use to input data. Remote control interface 295 may receive a signal from remote control unit 290 and then send that signal to processor 280. Remote control interface 295 may be, for example, a photo detector. Audio/video circuitry 215 may be any suitable circuitry for converting data from processor 280 into audio and/or video signals for display on display 270, recording on recorder 275, and/or output on audio output 277. Display 270 may be any suitable device for presenting images to a viewer, such as a television, a monitor, a computer monitor, a personal digital assistant, etc. Audio output 277 may be any suitable device or devices for allowing a user to listen to or otherwise provide an audio signal, such as amplifiers, speakers, etc. Audio output 277 may be combined or partly combined with display 270. Finally, recorder 275 may be any suitable device for recording video signals and data, such as a video cassette recorder, a disk drive, a memory card, etc.

Figure 3:
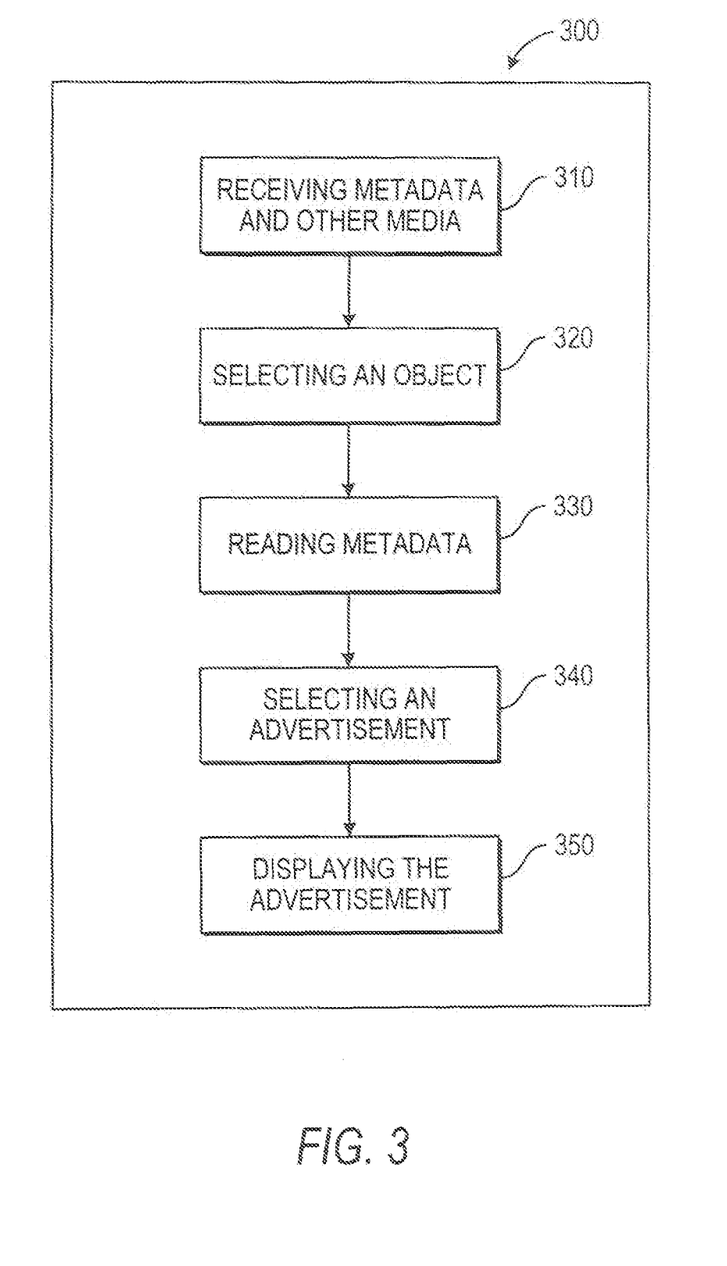
FIG. 3 is a flow chart of a process in which an advertisement may be selected based on the user's selection of an object and that may be used with various embodiments of the present invention.

FIG. 3 is a flow chart of a process 300 in accordance with various embodiments of the present invention. As illustrated, at step 310, process 300 may begin by receiving metadata and other media. Receiving metadata and other media, as mentioned above, may be accomplished by utilizing a receiver that may receive signals and/or data.

Next, at step 320, process 300 may select an object located within a viewing plane of a viewing device. For example, process 300 may use an audio/video coding method, such as MPEG-4 that allows objects to be defined. The selecting of an object may be accomplished, as mentioned above, by a processor that utilizes a user's input signal. A user's input signal may include the selection of an object displayed on a video display unit with a cursor and/or a command to move a cursor displayed on a video display unit to any point within a video display's viewing plane. A user's input signal, as described above, may be entered through a wired or wireless remote control unit.

To select an object, the processor may be running software that enables certain objects within the viewing plane of a video device to be selected. For example, the processor may utilize visual pattern recognition software that tracks colors, shapes, etc. Alternatively, the processor may utilize a downloaded predefined selectable target area to select objects displayed within the viewing plane of the viewing device.

At step 330, process 300 may read metadata. The metadata may be attached to and/or associated with media or a selectable object imbedded within the media. Reading metadata may be accomplished by a processor. The metadata, as described in detail above, may contain characteristics describing media and/or objects. In addition, the metadata may contain a source address (e.g., a URL) to download an advertisement from a remote location, as also described below.

At step 340, process 300 may select an advertisement. The selecting of an advertisement may be based on metadata attached to and/or associated with media and/or a selectable object imbedded within the media. For example, when media and/or a selectable object within the media is selected, the metadata attached to and/or associated with the media and/or selectable object may be read. Then, an advertisement corresponding to the metadata read may be selected. The advertisement may be selected by comparing the metadata of the media or selected object with metadata from advertisements. The advertisements may be provided from a suitable remote location to the user's equipment at some suitable frequency (e.g., periodically, on-demand, via polling, etc), or may be provided from advertisements previously stored on the user's system, as will be explained below.

Finally, at step 350, process 300 may display the advertisement within the viewing plane of a viewing device.

Figure 4:
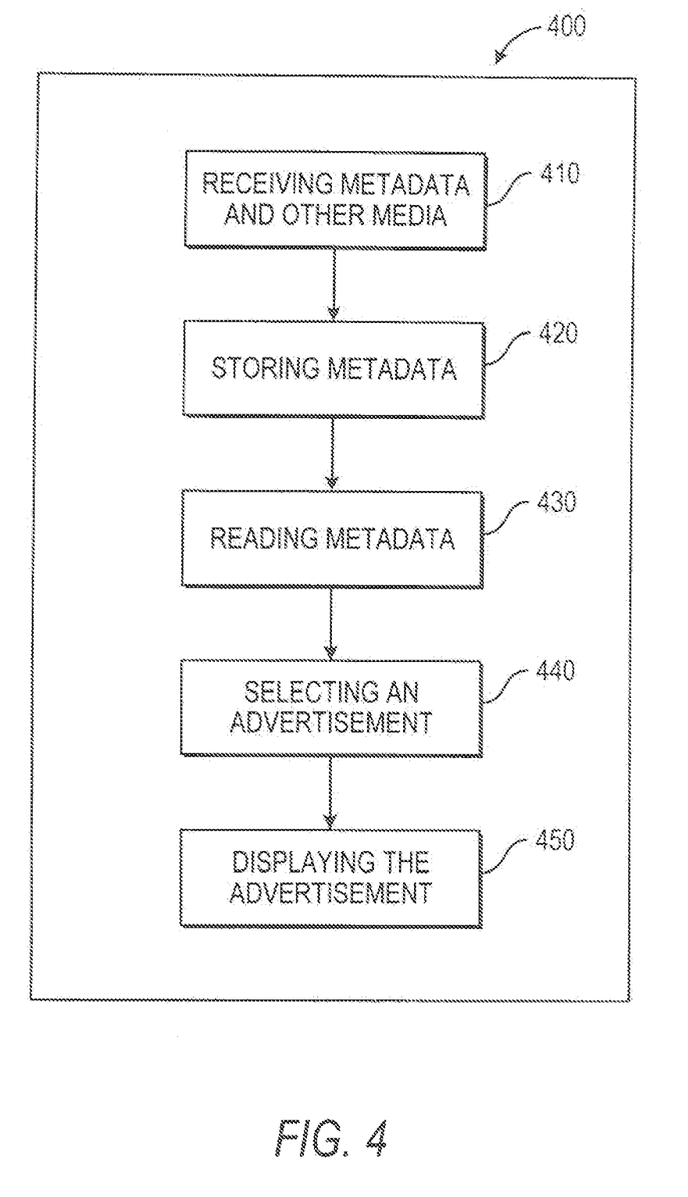
FIG. 4 is a flow chart of a process in which an advertisement may be selected from stored metadata and/or other media and that may be used with various embodiments of the present invention.

FIG. 4 is a flow chart of a process 400 in which metadata may be used to select an advertisement and that may be used to implement various embodiments of the present invention. Process 400 shows the receiving and the reading of metadata and other media as well as the selecting and the displaying of an advertisement at steps 410, 430, 440, and 450 respectively. Steps 410, 430, 440, and 450 are substantially the same as steps 310, 330, 340 and 350 which are described in detail above in connection with FIG. 3. Also shown in process 400 is the storing of metadata and other media at step 420. As stated above, the storing of the metadata and other media may be on any suitable storage unit such as a disk drive, or a memory card, etc. The storage unit may be located locally at or near a user's television viewing equipment, or may be located remotely from the user's viewing equipment.

Figure 5:
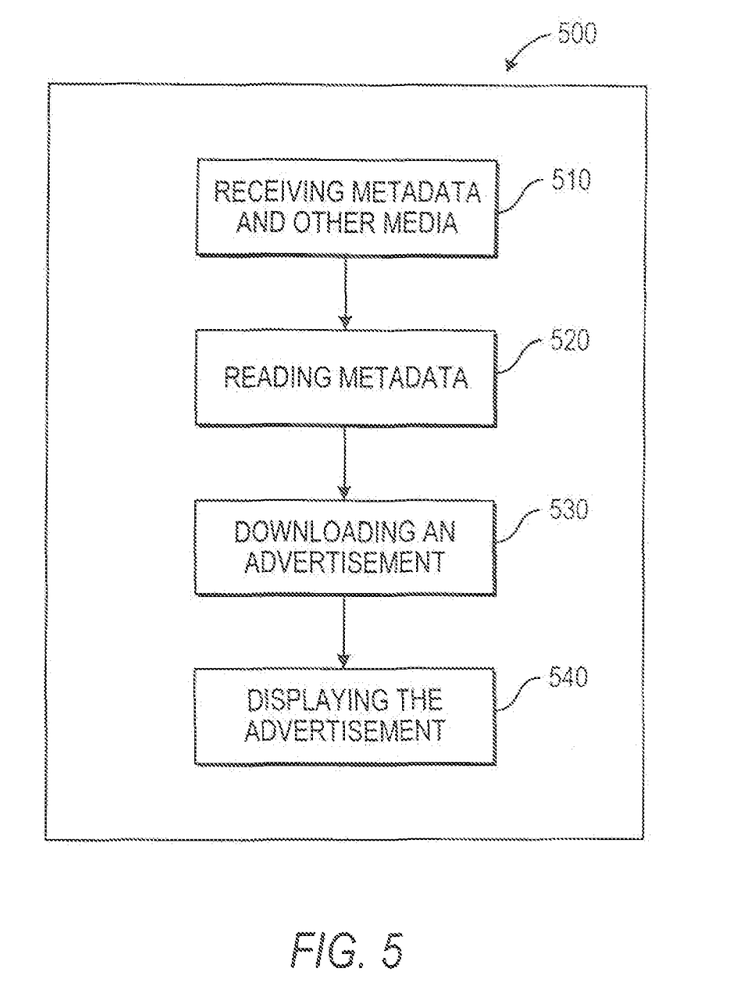
FIG. 5 is a flow chart of a process in which an advertisement may be downloaded using metadata and that may be used with various embodiments of the present invention.

FIG. 5 is a flow chart of a process 500 in which metadata may be used to select an advertisement and that may be used to implement various embodiments of the present invention. Process 500 shows the receiving and the reading of metadata and other media as well as displaying an advertisement at steps 510, 520, and 540 respectively. Steps 510, 520, and 540, are substantially the same as steps 310, 330, and 350 which are described in detail above in connection with FIG. 3. Also shown in process 500 is the downloading of an advertisement based on metadata at step 530. As stated above, metadata may contain a source address (e.g., a URL) to download an advertisement from a remote location. For example, a guidance application utilizing any suitable communication technology (e.g., the Internet using a HyperText Transfer Protocol) may obtain an advertisement by downloading it from a source address. The advertisement that is presented to a viewer may be the advertisement currently available at the source (e.g., a web page). As time passes, the advertiser or the system provider may change the content of the advertisement that is provided to a user by simply modifying the advertisement at the source. In this way, "fresh" advertisements may be presented each time a user plays back a recorded program.

Alternatively, these "fresh" advertisements may be provided by, for example, assigning identifiers to a specific advertisement or a group of advertisements. These advertisements with identifiers may be downloaded and stored in the user's equipment or may be available to a user's system at some remote location available at some suitable frequency (e.g., periodically, on-demand, via polling, etc).

Figure 6:
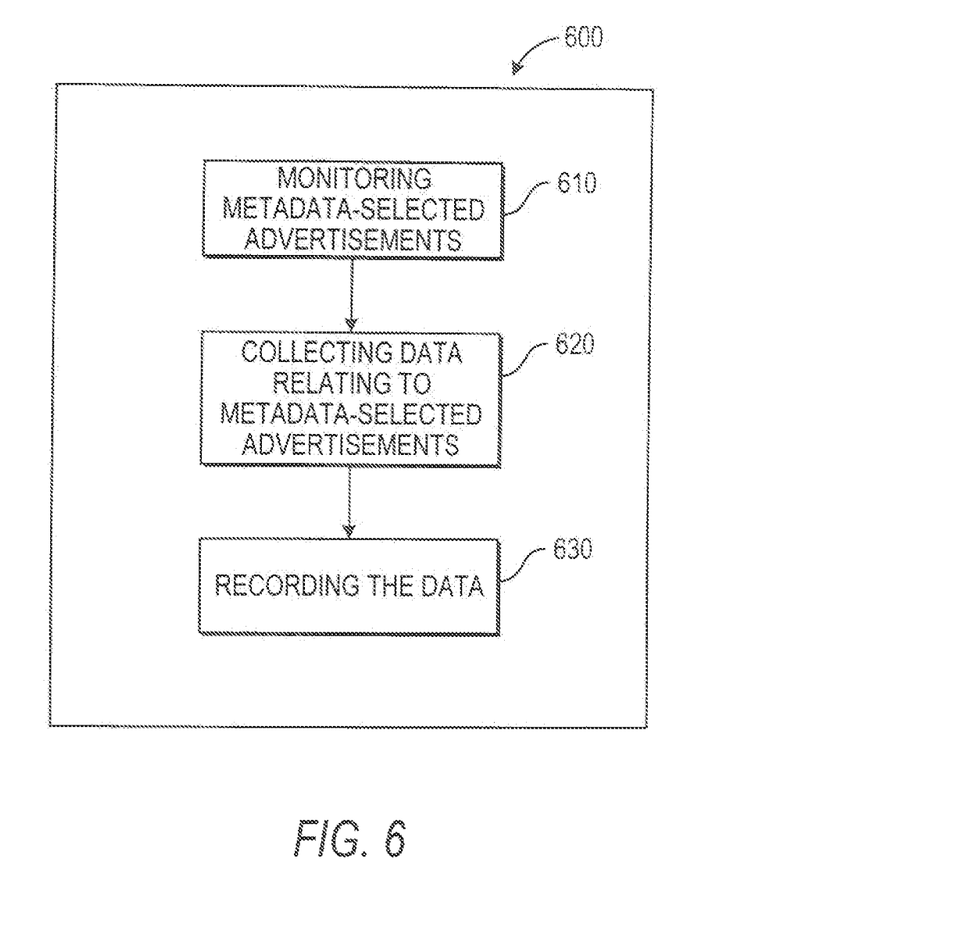
FIG. 6 is a flow chart of a process in which data relating to metadata-selected advertisements may be monitored, collected and recorded and that may be used with various embodiments of the present invention.

FIG. 6 is a flow chart of a process 600 in which data relating to metadata-selected advertisements may be collected and recorded. Process 600 shows monitoring metadata-selected advertisements at step 610. Monitoring of the metadata-selected advertisements may be accomplished through a receiver and/or a processor, as described above in connection with FIG. 2, blocks 220 and 280, respectively. Furthermore, monitoring may be accomplished at any suitable times (e.g. continuously, periodically, on-demand, etc.). Process 600 also shows collecting data relating to metadata-selected advertisements at step 620. Such collecting of data may be accomplished through a processor, as described in detail above. Finally, process 600 shows the recording of the data. Recording the data may be done on any suitable storage unit such as a, a disk drive, or a memory card, etc.

In addition to monitoring, collecting, and recording, marketing information may also be provided to advertisers over a communications network, as described in detail above. For example, marketing information may be provided to advertisers in a real-time or in a block time format. A block-time format may include daily, weekly, monthly, yearly, etc. information. As stated above marketing information may include information such as the program recorded, the number of times an advertisement is accessed, the time at which the advertisement was accessed, etc., and/or include demographic information associated with a user's account.

Figure 7:
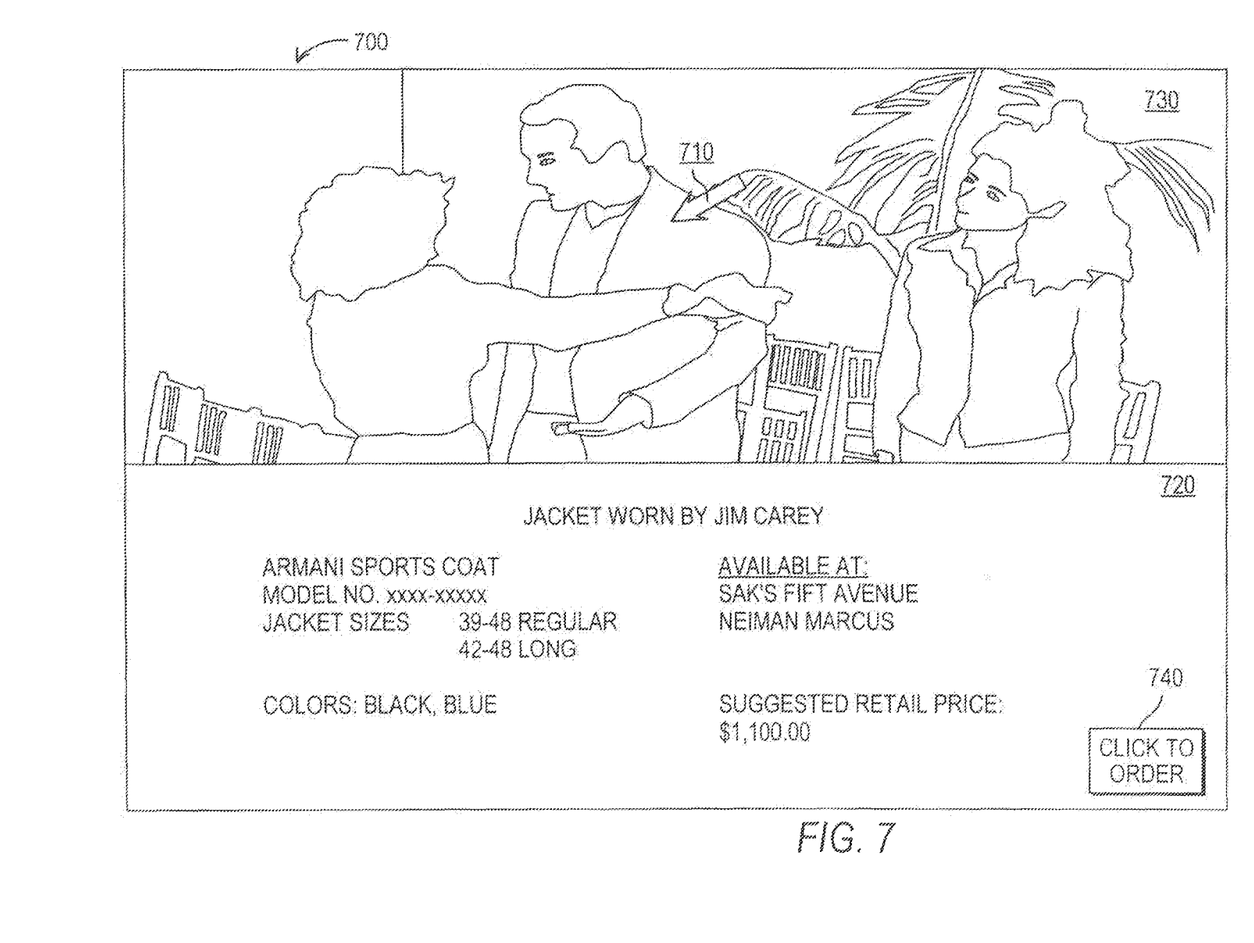
FIG. 7 is an illustration of a screen display that may be used to implement various embodiments of the present invention.

Turning now to FIG. 7, a program advertisement screen 700 shows one example of how advertisements may be selected and displayed in accordance with the present invention. Program advertisement screen 700 may include a cursor 710, a metadata-selected advertisement 720, a scene 730, and order button 740. Scene 730 shows a scene in which the user may select an object. Cursor 710 may be controlled by a user through a user input, as described in detail above, and may also be utilized by a user to select an object within the viewing plane of a video device, as depicted in scene 730. Selected advertisement 720 shows a displayed advertisement for the user selected object. If desired, the user may then select order button 740 to order the selected item. The selected item may be charged to a user credit card number, a user's account, and/of any other method or purchasing items from a remote location.

Screen 700 is merely illustrative of screens and methods that may be used to select and display metadata selected advertisements. Any suitable screens and methods of displaying advertisements may be used in accordance with the present invention.

Thus, systems and methods for providing metadata-linked advertisements are provided. Persons skilled in the art will appreciate that the present invention can be practiced by other than the described embodiments, which are presented for purposes of illustration rather than of limitation, and that the present invention is limited only by the claims that follow.

What is claimed is:

1. A method comprising:
   generating for display a media asset;
   receiving a user selection of an object depicted in a scene of the media asset;
   in response to receiving the user selection of the object, retrieving, from a storage device, a first metadata item that describes the object;
   retrieving, from the storage device, a second metadata item associated with an advertisement, wherein the second metadata item describes content of the advertisement;
   determining whether the first metadata item matches the second metadata item;
   in response to determining that the first metadata item matches the second metadata item:
   retrieving, from the storage device, the advertisement; and
   generating for display the advertisement.

2. The method of claim 1, wherein receiving the user selection of the object depicted in the scene of the media asset further comprises receiving a user selection of the object based on a location of a cursor in the scene of the media asset.

3. The method of claim 2, further comprising:
   receiving an input signal indicating a position where the user wants to place the cursor; and
   determining the location of the cursor based on the input signal.

4. The method of claim 1, wherein retrieving, from the storage device, the advertisement further comprises:
   determining whether the advertisement is stored locally; and
   in response to determining that the advertisement is not stored locally, downloading the advertisement from a remote storage device.

5. The method of claim 1, wherein determining whether the first metadata item matches the second metadata item further comprises comparing the first metadata item with the second metadata item while the media asset is being displayed.

6. The method of claim 1, wherein determining whether the first metadata item matches the second metadata item further comprises determining whether the object is associated with content of the advertisement.

7. The method of claim 1, wherein generating for display the advertisement further comprises generating for simultaneous display the scene of the media asset and the advertisement.

8. The method of claim 1, further comprising receiving a user input to order the object.

9. The method of claim 1, further comprising storing the advertisement in local storage.

10. The method of claim 1, further comprising:
receiving a plurality of third metadata items, wherein each metadata item of the plurality of third metadata items is associated with a respective one of a plurality of advertisements;
comparing the first metadata item to each metadata item of the plurality of third metadata items; and
determining, based on the comparing, whether the first metadata item matches a metadata item of the plurality of third metadata items.

11. A system comprising:
control circuitry configured to:
generate for display a media asset;
receive a user selection of an object depicted in a scene of the media asset;
in response to receiving the user selection of the object, retrieve, from a storage device, a first metadata item that describes the object;
retrieve, from the storage device, a second metadata item associated with an advertisement, wherein the second metadata item describes content of the advertisement;
determine whether the first metadata item matches the second metadata item;
in response to determining that the first metadata item matches the second metadata item:
retrieve, from the storage device, the advertisement; and
generate for display the advertisement.

12. The system of claim 11, wherein, when receiving the user selection of the object depicted in the scene of the media asset, the control circuitry is further configured to receive a user selection of the object based on a location of a cursor in the scene of the media asset.

13. The system of claim 12, wherein the control circuitry is further configured to:
receive an input signal indicating a position where the user wants to place the cursor; and
determine the location of the cursor based on the input signal.

14. The system of claim 11, wherein the control circuitry is further configured to:
determine whether the advertisement is stored locally; and
in response to determining that the advertisement is not stored locally, download the advertisement from a remote storage device.

15. The system of claim 11, wherein, when determining whether the first metadata item matches the second metadata item, the control circuitry is further configured to compare the first metadata item with the second metadata item while the media asset is being displayed.

16. The system of claim 11, wherein, when determining whether the first metadata item matches the second metadata item, the control circuitry is further configured to determine whether the object is associated with content of the advertisement.

17. The system of claim 11, wherein, when generating for display the advertisement, the control circuitry is further configured to generate for simultaneous display the scene of the media asset and the advertisement.

18. The system of claim 11, wherein the control circuitry is further configured to receive a user input to order the object.

19. The system of claim 11, wherein the control circuitry is further configured to store the advertisement in local storage.

20. The system of claim 11, wherein the control circuitry is further configured to:
receive a plurality of third metadata items, wherein each metadata item of the plurality of third metadata items is associated with a respective one of a plurality of advertisements;
compare the first metadata item to each metadata item of the plurality of third metadata items; and
determine, based on the comparing, whether the first metadata item matches a metadata item of the plurality of third metadata items.

* * * * *